(12) United States Patent
Akiyama (10) Patent No.: US 6,607,276 B1
(45) Date of Patent: Aug. 19, 2003

(54) ILLUMINATING OPTICAL SYSTEM AND PROJECTOR

(75) Inventor: Koichi Akiyama, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/525,259

(22) Filed: Mar. 14, 2000

(30) Foreign Application Priority Data

Apr. 9, 1999 (JP) ............................................ 11-102239

(51) Int. Cl.⁷ ........................ G03B 21/14; G03B 21/20; F21V 7/00; F21V 5/00
(52) U.S. Cl. ............................ 353/38; 353/20; 353/102; 362/309; 362/330; 362/331
(58) Field of Search ........................... 353/38, 102, 20; 362/307, 309, 331, 330

(56) References Cited

U.S. PATENT DOCUMENTS 5,649,753 A * 7/1997 Masumoto .................. 353/102
6,219,112 B1 * 4/2001 Yoneyama et al. ............. 349/5
6,260,972 B1 * 7/2001 Robinson et al. ............. 353/38
6,286,961 B1 * 9/2001 Ogawa ......................... 353/38

* cited by examiner

Primary Examiner—Russell Adams
Assistant Examiner—Magda Cruz
(74) Attorney, Agent, or Firm—Oliff & Berridge, PLC (57) ABSTRACT

An illuminating optical system includes a light source device for emitting a substantially parallel light beam, a first lens array for dividing the light beam into a plurality of sub light beams, and a superimposing lens for superimposing the sub light beams on a surface to be illuminated. In the first lens array, the size of each of the small lenses disposed on the outer periphery is set to be smaller than the size of each of the small lenses disposed on the center so that light application areas formed by the plurality of sub light beams emitted from the plurality of small lenses have substantially the same size within a predetermined error range. Therefore, light emitted from a light source can be efficiently utilized.

10 Claims, 11 Drawing Sheets

RELATED ART

ILLUMINATING OPTICAL SYSTEM AND PROJECTOR

BACKGROUND OF THE INVENTION

1. Field of the Invention

The present invention relates to an illuminating optical system, and to a projector for projecting and displaying an image using the system.

2. Description of the Related Art

In a projector, illumination light emitted from an illuminating optical system is modulated by liquid crystal panels or the like according to image information (image signals), and the modulated illumination light is projected onto a screen, thereby achieving image display.

In the projector, it is preferable that the luminance distribution of an image to be projected and displayed be substantially uniform. For this reason, in the projector, a so-called optical integrator system is used, which is able to emit light with a substantially uniform intensity distribution onto a portion of a liquid crystal panel or the like on which image light is formed (illumination area).

Figure 10:
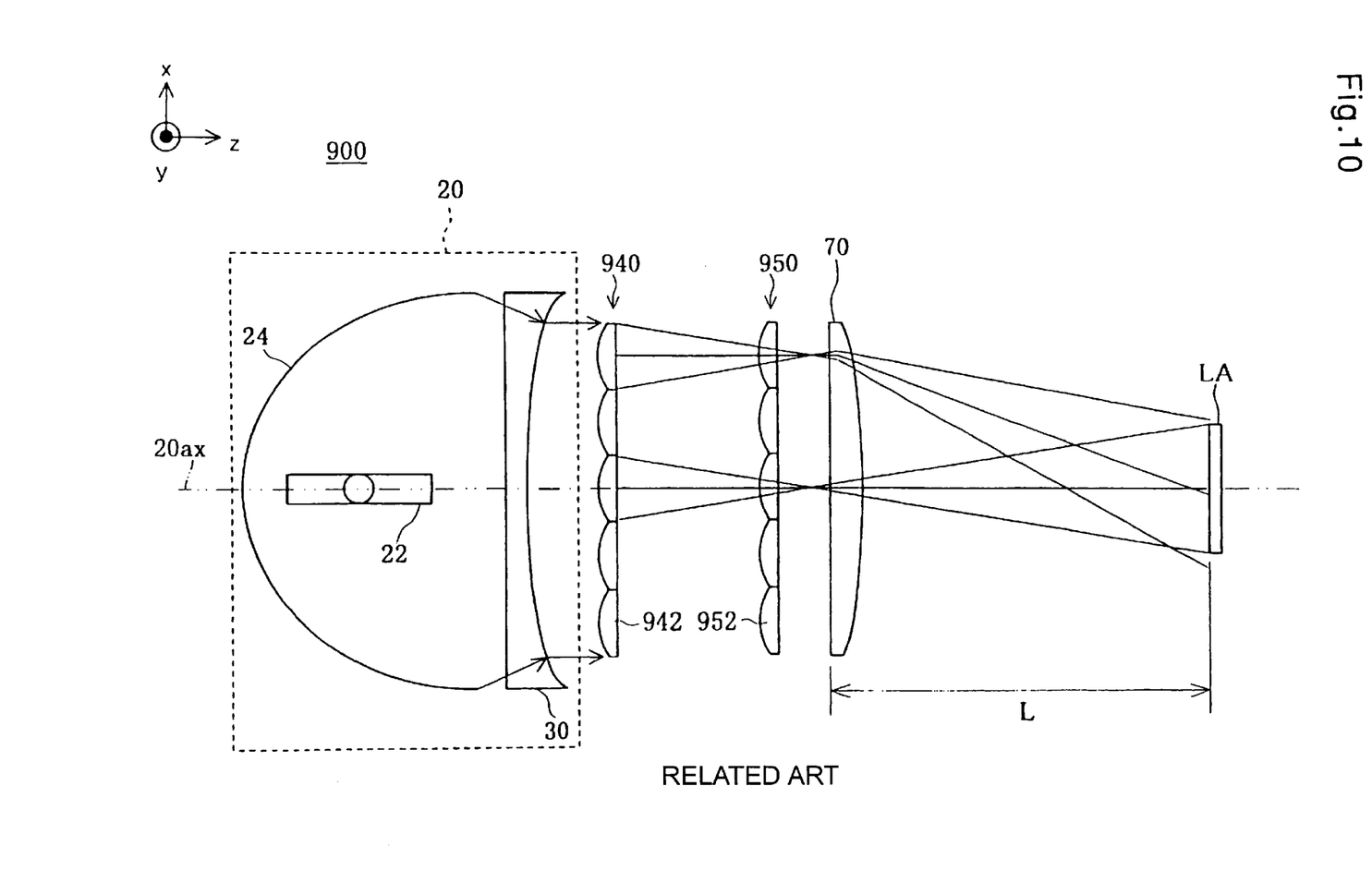
FIG. 10 is an explanatory view showing a conventional illuminating optical system that constitutes an optical integrator system of a projector.

FIG. 10 is an explanatory view showing a conventional illuminating optical system that constitutes an optical integrator system of a projector. An illuminating optical system 900 includes a light source device 20, a first lens array 940, a second lens array 950, and a superimposing lens 70. Optical elements are disposed with reference to a light source optical axis 20ax that is an optical axis of a substantially parallel light beam emitted from the light source device 20.

The light source device 20 includes a light source lamp 22, a reflector 24, and a collimator lens 30, and has the function of converting a light beam radially emitted from the light source lamp 22 into a substantially parallel light beam, and emitting the substantially parallel light beam.

Figure 11:
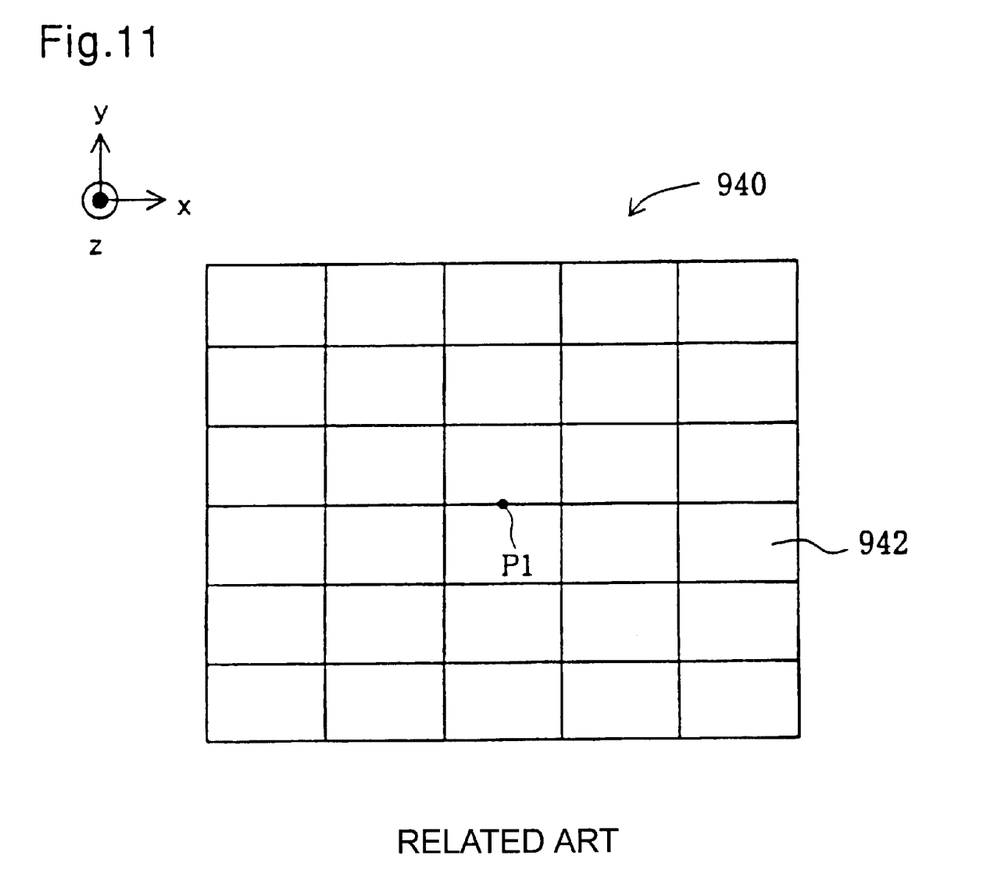
FIG. 11 is a plan view of a first lens array 940 as viewed from the z direction in FIG. 10.

The first lens array 940 has the function of dividing the substantially parallel light beam emitted from the light source device 20 into a plurality of sub light beams. FIG. 11 is a plan view of the first lens array 940 as viewed from the z direction in FIG. 10. In the illuminating optical system 900, the first lens array 940 is disposed so that the center point P1 coincides with the light source optical axis 20ax (FIG. 10) of the illuminating optical system. The first lens array 940 includes a plurality of first small lenses 942. Each of the first small lenses 942 is a plano-convex lens (FIG. 10) having the same shape, and the external shape as viewed from the z direction is set to be a substantially rectangular shape that is similar to the shape of an illumination area LA.

The second lens array 950 has the function of forming images of the first small lenses 942 of the first lens array 940 on the surface to be illuminated. The second lens array 950 is provided corresponding to the first lens array 940, and the external shape of each second small lens 952 is substantially the same as that of each first small lens 942 of the first lens array 940 shown in FIG. 11.

The superimposing lens 70 is a plano-convex lens having a spherical convex surface. The superimposing lens 70 has the function of superposing and emitting the plurality of sub light beams emitted from the first small lenses 942 of the first lens array 940 onto the surface to be illuminated. In this specification, "surface to be illuminated" means a surface including the illumination area LA that is a desired area to be illuminated by the illuminating optical system 900. If the optical integrator system shown in FIG. 10 is used, a light application area having a substantially uniform light intensity distribution can be formed in the illumination area LA, even if the light intensity distribution of a substantially parallel light beam emitted from the light source device 20 is not uniform.

As is well known, the superimposing lens 70 having a spherical convex surface has spherical aberration. The aberration of the superimposing lens 70 increases with distance from the light source optical axis 20ax. That is, as shown in FIG. 10, the size of the light application area formed on the surface to be illuminated by sub, light beams emitted from the first small lenses 942 that are disposed on the outer periphery of the first lens array 940 is larger than that of the light application area formed on the surface to be illuminated by the sub light beams emitted from the first small lenses 942 that are disposed on the center of the first lens array 940. In this case, as shown in FIG. 10, the light application area of the sub light beams emitted from the first small lenses 942 on the outer periphery is defocused on the surface to be illuminated, and the sub light beams are applied onto an unnecessary area other than the illumination area LA, so that light emitted from the light source device cannot be efficiently utilized. Such problems becomes more noticeable as the size of the illuminating optical system is reduced, in other words, as the distance L between the superimposing lens 70 and the illumination area LA (that is, the focal distance f of the superimposing lens 70) is decreased.

SUMMARY OF THE INVENTION

The present invention is made to solve the above-described problems of the conventional art, and an object is to provide a technique that is able to efficiently utilize light emitted from a light source device.

In order to solve at least a part of the above-described problems, according to the present invention, there is provided an illuminating optical system including:

a light source device for emitting a substantially parallel light beam;

a first lens array having a plurality of first small lenses for dividing the light beam into a plurality of sub light beams; and a superimposing lens for superimposing and applying the plurality of sub light beams emitted from the first lens array onto a surface to be illuminated, wherein the size of each of the small lenses disposed on the outer periphery of the first lens array is set to be smaller than the size of each of the small lenses disposed on the center of the first lens array so that light application areas formed on the surface to be illuminated by the plurality of sub light beams emitted from the plurality of first small lenses have substantially the same size within a predetermined error range.

In the illuminating optical system of the present invention, since the size of each of the first small lenses of the first lens array is adjusted, the size of each of the light application areas formed on the surface to be illuminated by the sub light beams can be set to be substantially the same size within a predetermined error range, and consequently, light emitted from the light source device can be efficiently utilized.

In the illuminating optical system, each of the plurality of first small lenses may preferably have a similar shape as viewed from the direction of the central axis of the light beam.

This can easily set the size of each of the light application areas formed on the surface to be illuminated by the sub light beams to be substantially the same size within a predetermined error range.

In the illuminating optical system, the first lens array may be composed of two types of small lenses, relatively large first-type small lenses disposed on the center and relatively small second-type small lenses disposed on the outermost periphery.

If the first lens array is composed of two types of first small lenses in this way, a first lens array can be relatively easily obtained, that is able to set the size of each of the light application areas formed on the surface to be illuminated by the sub light beams to be substantially the same size within a predetermined error range.

In the illuminating optical system, each of the plurality of first small lenses may preferably have a substantially rectangular shape as viewed from the direction of the central axis, and the size of each of the first small lenses disposed on the outermost periphery of the first lens array may preferably be about 1% to 10% smaller per side with respect to the size of each of the first small lenses disposed on the center of the first lens array.

This makes it possible to efficiently adjust the size of each of the light application areas formed by the sub light beams.

Furthermore, the illuminating optical system may further include a second lens array having a plurality of second small lenses corresponding to the plurality of first small lenses of the first lens array, and of the plurality of second small lenses, a small lens that receives light emitted from the lenses disposed on the outer periphery of the first lens array may be a decentered lens.

If such a second lens array is used, positions of the light application areas formed by the sub light beams can be brought into coincidence with each other.

A second device of the present invention is a projector which may include:
  any one of the above illuminating optical systems that is a first device of the present invention;
  an electrooptical device having a light incident surface serving as a surface to be illuminated that is illuminated by the illuminating optical system and for modifying the incident light from the illuminating optical system according to image information; and
  a optical projection system for projecting the modulated light beam obtained by the electrooptical device.

In the projector of the present invention, the above-described illuminating optical systems are used. Therefore, since the light utilization efficiency is high in the projector, it is possible to improve the brightness of an image to be projected and displayed.

DETAILED DESCRIPTION OF THE PREFERRED EMBODIMENTS

A. First Embodiment of Illuminating Optical System

Figure 1:
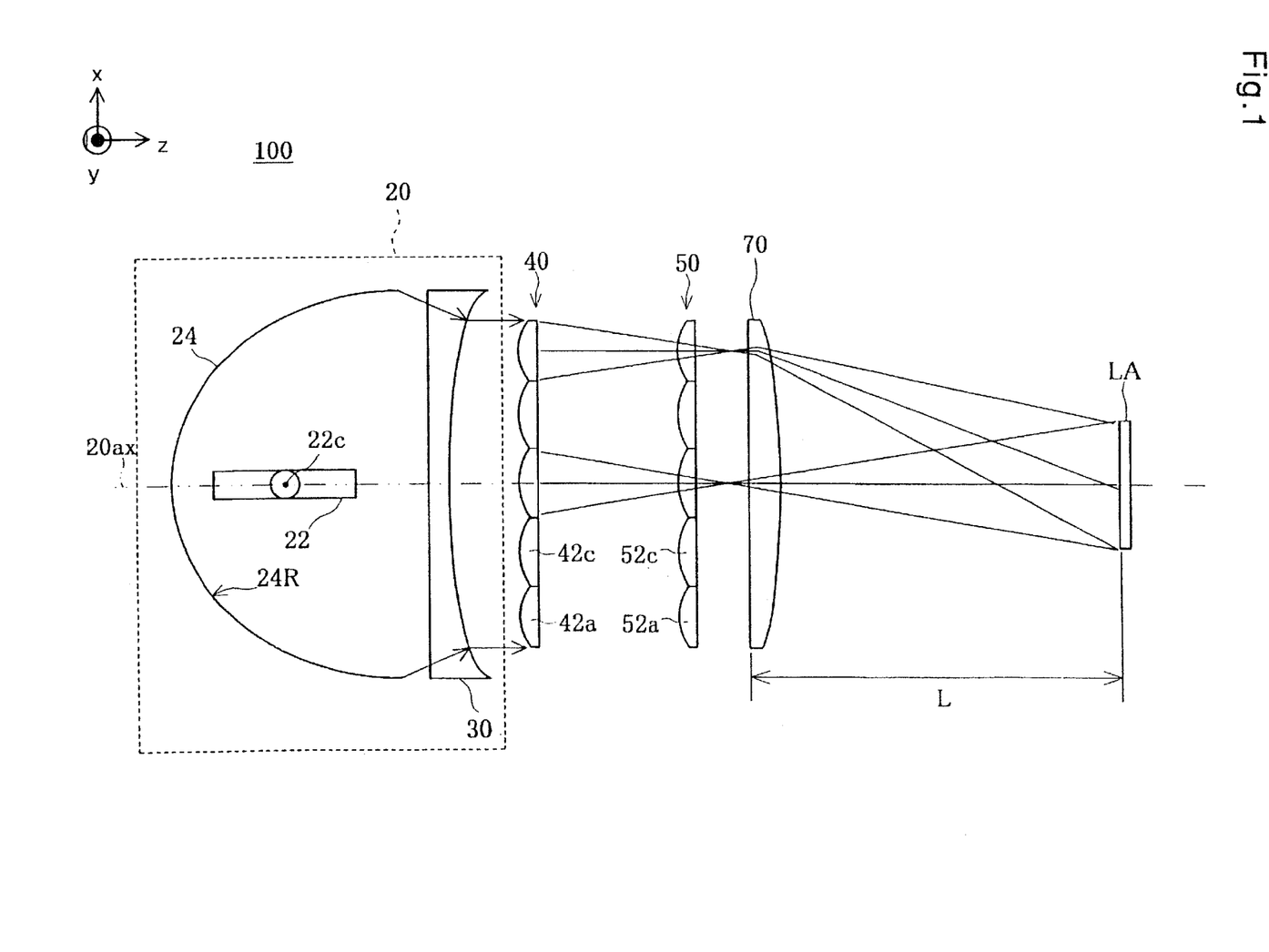
FIG. 1 is an explanatory view showing an example of an illuminating optical system to which the present invention is applied.

FIG. 1 is an explanatory view showing an example of an illuminating optical system to which the present invention is applied. Incidentally, FIG. 1 is a schematic plan view showing a principal part of an illuminating optical system 100. The illuminating optical system 100 in FIG. 1 includes a light source device 20, a first lens array 40, a second lens array 50, and a superimposing lens 70. In the illuminating optical system 100, the first and second lens arrays 940 and 950 of the conventional illuminating optical system 900 are modified. Optical elements are disposed with reference to a light source optical axis 20ax (the central axis of a light beam emitted from the light source device 20). That is, the first lens array 40, the second lens array 50, and the superimposing lens 70 are disposed so that the centers thereof substantially coincide with the light source optical axis 20ax, and they are substantially perpendicular to the light source optical axis 20ax.

The light source device 20 includes a light source lamp 22, a reflector 24, and a collimator lens 30. The reflector 24 is an elliptical reflector having a concave surface of an ellipsoid of revolution (ellipsoidal surface of revolution) 24R that is axisymmetric with respect to the light source optical axis 20ax. The ellipsoid of revolution is formed of, for example, glass ceramics. A dielectric multilayer film is formed on the ellipsoidal surface of revolution 24R, and the ellipsoidal surface of revolution 24R serves as a reflecting mirror. A metallic reflecting film, such as an aluminum film or a silver film, may be formed on the ellipsoidal surface of revolution 24R.

The light source lamp 22 emits light radially. The center 22c of the light source lamp 22 is disposed at a position of one focal point (first focal point) of two focal points of the elliptical reflector 24 on the light source optical axis 20ax that is near the elliptical reflector 24. "Center of the light source lamp" means the center 22c of an arc of the light source lamp 22. Light radially emitted from the light source lamp 22 is reflected by the elliptical reflector 24, and the reflected light travels toward the other focal point (second focal point) of the elliptical reflector 24. A high-pressure discharge lamp, such as a metal halide lamp or a high-pressure mercury lamp, is used as the light source lamp 22.

The collimator lens 30 has the function of converting the light reflected by the elliptical reflector 24 into substantially parallel light. This allows a light beam emitted from the light source device 20 to be converted into substantially parallel light. The center of the substantially parallel light beam emitted from the light source device 20 coincides with the light source optical axis 20ax.

As described above, while the light source device 20 for emitting a substantially parallel light beam that includes the elliptical reflector 24 and the collimator lens 30 is used in this embodiment, a light source device that includes a paraboloidal reflector having a concave surface in the shape of a paraboloidal surface of revolution may be used instead. Any device may be used as the light source device in the present invention, as long as it emits a substantially parallel light beam.

Figure 2:
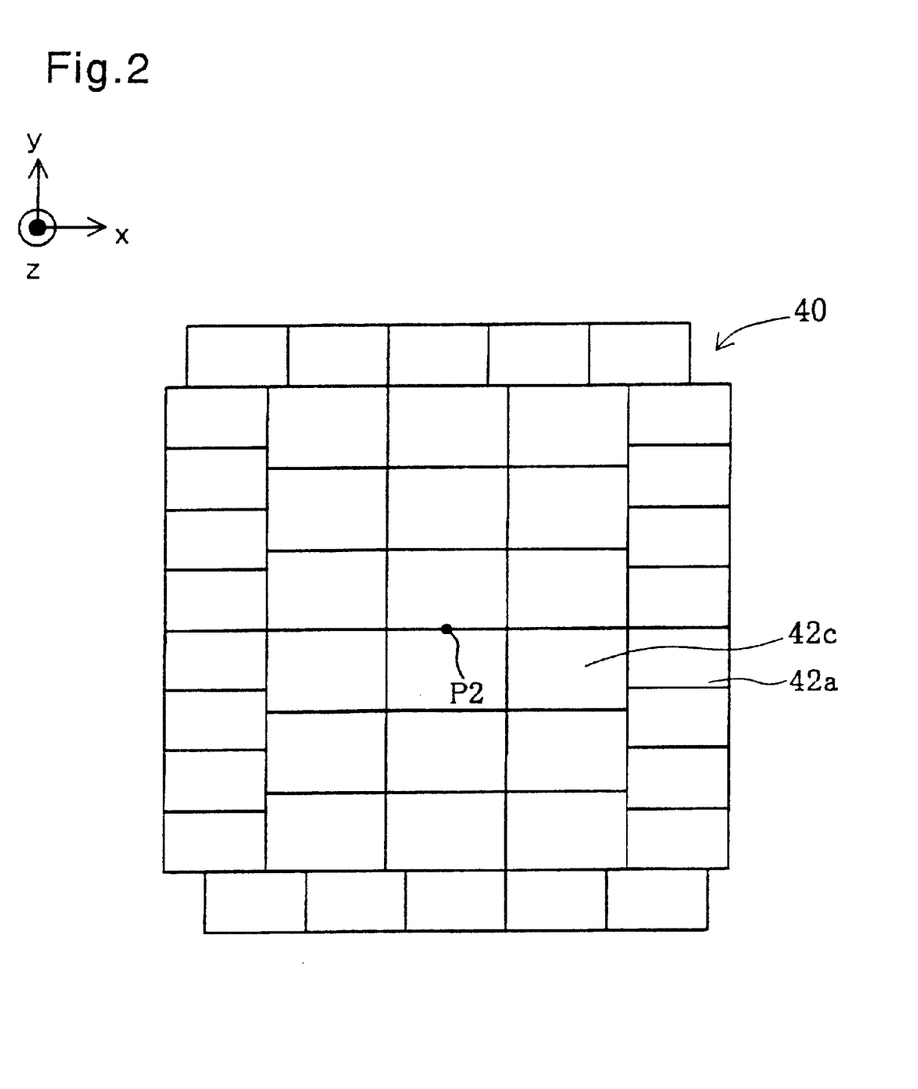
FIG. 2 is an explanatory view showing a lens array 40 in FIG. 1.

The first lens array 40 (FIG. 1) has the function of dividing the light beam emitted from the light source device 20 into a plurality of sub light beams and emitting the partial light beams. FIG. 2 is an explanatory view showing the lens array 40 in FIG. 1. FIG. 2 shows a plan view of the first lens array 40 in FIG. 1 as viewed from the z direction. In the illuminating optical system 100 (FIG. 1), the first lens array 40 is disposed so that the center point P2 thereof coincides with the light source optical axis 20ax of the illuminating optical system 100. The plan view in FIG. 2 shows a cross section of the first lens array 40 taken along the xz plane passing through the center point P2.

The first lens array 40 includes relatively large first-type small lenses 42c on the center thereof, and relatively small second-type small lenses 42a on the outer periphery thereof. Each of the central first-type small lenses 42c is a plano-convex lens (FIG. 1) having substantially the same shape, and the external shape as viewed from the z direction is set to be substantially similar to the shape of the illumination area LA. For example, when a light incident surface of a liquid crystal panel is assumed as the surface to be illuminated, and if the aspect ratio (ratio of the dimensions of the width and height) of an effective image display area (illumination area LA) is 4:3, the aspect ratio of each first small lens 42c is set to be 4:3. Each of the outer peripheral second-type small lenses 42a is a plano-convex lens (FIG. 1) having substantially the same shape, and the external shape as viewed from the z direction is set to be substantially similar to the shape of the illumination area LA. Although each of the first-type small lenses 42c and each of the second-type small lenses 42a shown in FIG. 2 have quite different sizes from each other for the convenience of description, the size of each of the second-type small lenses 42a is actually about 1% to 10% smaller per side with respect to the size of each of the first-type small lenses 42c, which will be described later.

The second lens array 50 (FIG. 1) has the function of forming images of the first small lenses 42a and 42c of the first lens array 40 on the surface to be illuminated. The second lens array 50 has a plurality of second small lenses 52a and 52c corresponding to the plurality of first small lenses 42a and 42c of the first lens array 40. The external shape of each of the plurality of the second small lenses 52a and 52c as viewed from the z direction is substantially the same as the external shape of each of the plurality of first small lenses 42a and 42c of the first lens array 40 shown in FIG. 2. A lens array that is the same as the first lens array 40 can be used as the second lens array 50.

The plurality of sub light beams emitted by the plurality of first small lenses 42a and 42c of the first lens array 40 shown in FIG. 1 enter the superimposing lens 70 via the plurality of second small lenses 52a and 52c of the second lens array 50. The superimposing lens 70 superimposes and emits the plurality of incident sub light beams onto the surface to be illuminated. While a plano-convex lens is used for the superimposing lens 70, as shown in FIG. 1, a biconvex lens may be used. As will be understood from the above description, the first and second lens arrays 40 and 50, and the superimposing lens 70 of this embodiment constitute an optical integrator system. This makes it possible to apply light having a substantially uniform intensity distribution on the illumination area LA, even if the intensity distribution within a cross section of the light beam emitted from the light source device 20 is not uniform.

Incidentally, as described above, in the conventional illuminating optical system 900, the sub light beams emitted from the small lenses 942 of the first lens array 940 are applied onto an unnecessary area other than the illumination area LA on the surface to be illuminated due to the aberration of the superimposing lens 70. That is, the aberration of the superimposing lens 70 causes the light beams passing therethrough to be defocused, and enlarges the light application areas formed by the sub light beams on the surface to be illuminated. This tendency becomes more noticeable as the distance L between the superimposing lens 70 and the illumination area LA (that is, the focal distance f of the superimposing lens 70) is decreased, or as the distance increases from the center (light source optical axis 20ax) of the superimposing lens 70. Therefore, when the distance L between the superimposing lens 70 and the illumination area LA is set to be relatively short, as shown in FIG. 10, it is difficult to allow the light emitted from the light source device 20 to efficiently enter the illumination area LA.

In the illuminating optical system 100 shown in FIG. 1 to which the present invention is applied, a decrease in light utilization efficiency due to the aberration of the superimposing lens 70 is prevented by arranging the shape of the plurality of small lenses of the first lens array 40, as described in FIG. 2. That is, in the first lens array 40 of the illuminating optical system 100, the size of each small lens 42a disposed on the outer periphery away from the light source optical axis 20ax, where the aberration of the superimposing lens 70 is relatively large, is set to be smaller than the size of each small lens 42c disposed towards of the light source optical axis 20ax (center), where the aberration of the superimposing lens 70 is relatively small. In this case, a cross sectional area of each sub light beam emitted from each small lens 42a disposed on the outer periphery is smaller than a cross sectional area of each sub light beam emitted from each small lens 42c disposed on the side of the light source optical axis 20ax (center). However, the sub light beams emitted from the outer peripheral small lenses 42a are affected by the aberration of the superimposing lens 70, whereas the sub light beams emitted from the central small lenses 42c are not so affected by the aberration of the superimposing lens 70. Therefore, it is possible to set the size of a light application area formed by the sub light beams emitted from the outer peripheral small lenses 42a of the first lens array 40 to be substantially equal to the size of a light application area formed by the sub light beams emitted from the central small lenses 42c.

Figure 3:
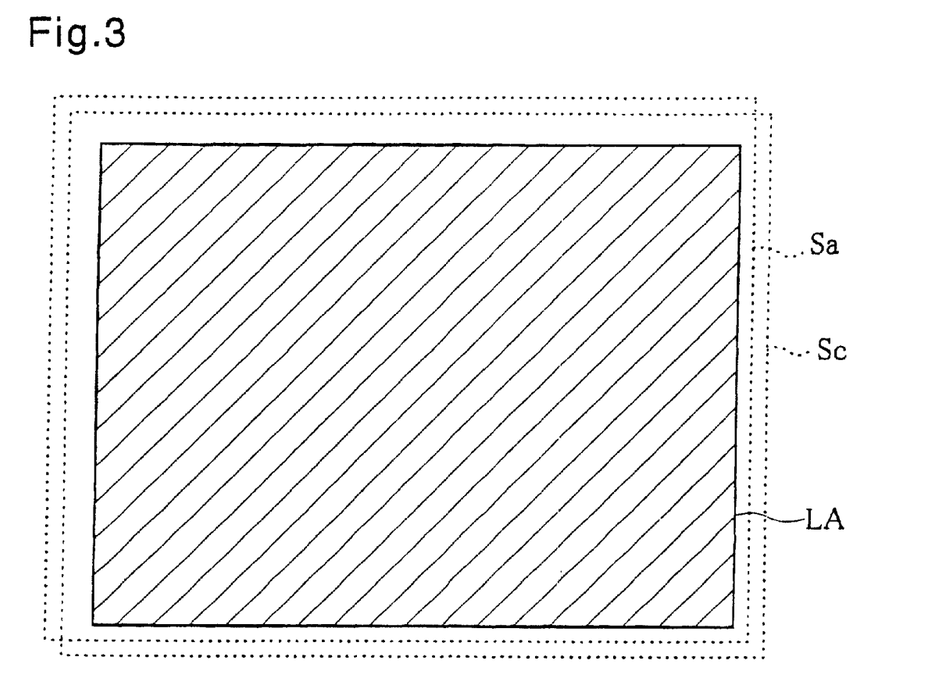
FIG. 3 is an explanatory view showing a light application area formed on a surface to be illuminated by an illuminating optical system 100 in FIG. 1.

FIG. 3 is an explanatory view showing a light application area formed on the surface to be illuminated by the illuminating optical system 100 in FIG. 1. The diagonally shaded area is the illumination area LA in FIG. 1. As shown in FIG. 3, a sub light beam emitted from one central small lens 42c of the first lens array 40 forms a light application area Sc including the illumination area LA. In this case, the sub light beam emitted from one outermost peripheral small lens 42a forms a light application area Sa. In this way, by adjusting the sizes of the small lenses of the first lens array, it is possible to set the sizes of the light illumination areas Sc and Sa formed by the two sub light beams to be equal to each other. This makes it possible to allow the light emitted from the light source device 20 in FIG. 1 to efficiently enter the illumination area LA to be utilized, regardless of the aberration of the superimposing lens 70.

In the illuminating optical system 100 in FIG. 1, while the first lens array 40 is composed of two types of first small lenses, the central small lenses 42c each having the first-type size, and the outermost peripheral small lenses 42a each having the second-type size, as shown in FIG. 2, the composition of the plurality of small lenses included in the first lens array 40 is not limited thereto. For example, the size of each small lens may be reduced in multiple stages as the distance increases from the center of the first lens array 40. In addition, in the lens array 40 shown in FIG. 2, while the shape of each central first-type small lens 42c is substantially similar to the shape of each outermost peripheral second-type small lens 42a, the shape is not limited thereto. For example, when the aberration of the. superimposing lens 70 in the x direction differs from the aberration in the y direction, the aspect ratio of the small lens at a position away from the center point P2 in the x direction may be set to be different from that of the small lens at a position away from the center point P2 in the y direction based on the difference of the aberration.

That is, in general, the size of each of the plurality of first small lenses of the first lens array may gradually decreases from the center of the first lens array toward the periphery, so that the light application areas formed by the plurality of sub light beams emitted from the plurality of first small lenses have substantially the same size within a predetermined error range. In this embodiment, the size of each of the light application areas is adjusted with reference to the size of the light application area formed by the sub light beams emitted from the first small lenses 42c disposed on the center of the first lens array. For example, it is preferable that the size of the light application area formed by the sub light beams emitted from the first small lenses disposed at positions away from the light source optical axis 20ax (on the outer periphery) be set to fall within an error range of about 5% per one side of the light application area with respect to the size of the reference light application area.

B. Second Embodiment of Illuminating Optical System

If the illuminating optical system 100 shown in FIG. 1 is used, the light emitted from the light source device can be utilized efficiently, regardless of the aberration of the superimposing lens. However, the aberration of the superimposing lens is not always corrected. That is, as shown in FIG. 1, the central axes of the sub light beams emitted from the outer peripheral small lenses 42a of the first lens array 40 do not align with the light source optical axis 20ax when the sub light beam fluxes reach the surface to be illuminated via the second lens array 50 and the superimposing lens 70. For this reason, there may be a case where the position of the light application area Sc formed by the sub light beams emitted from the central small lenses 42c of the first lens array 40 does not very accurately coincide with the position of the light application area Sa formed by the sub light beams emitted from the outer peripheral small lenses 42a. In this case, there is a risk that the light intensity distribution in the illumination area LA is not sufficiently uniform.

Figure 4:
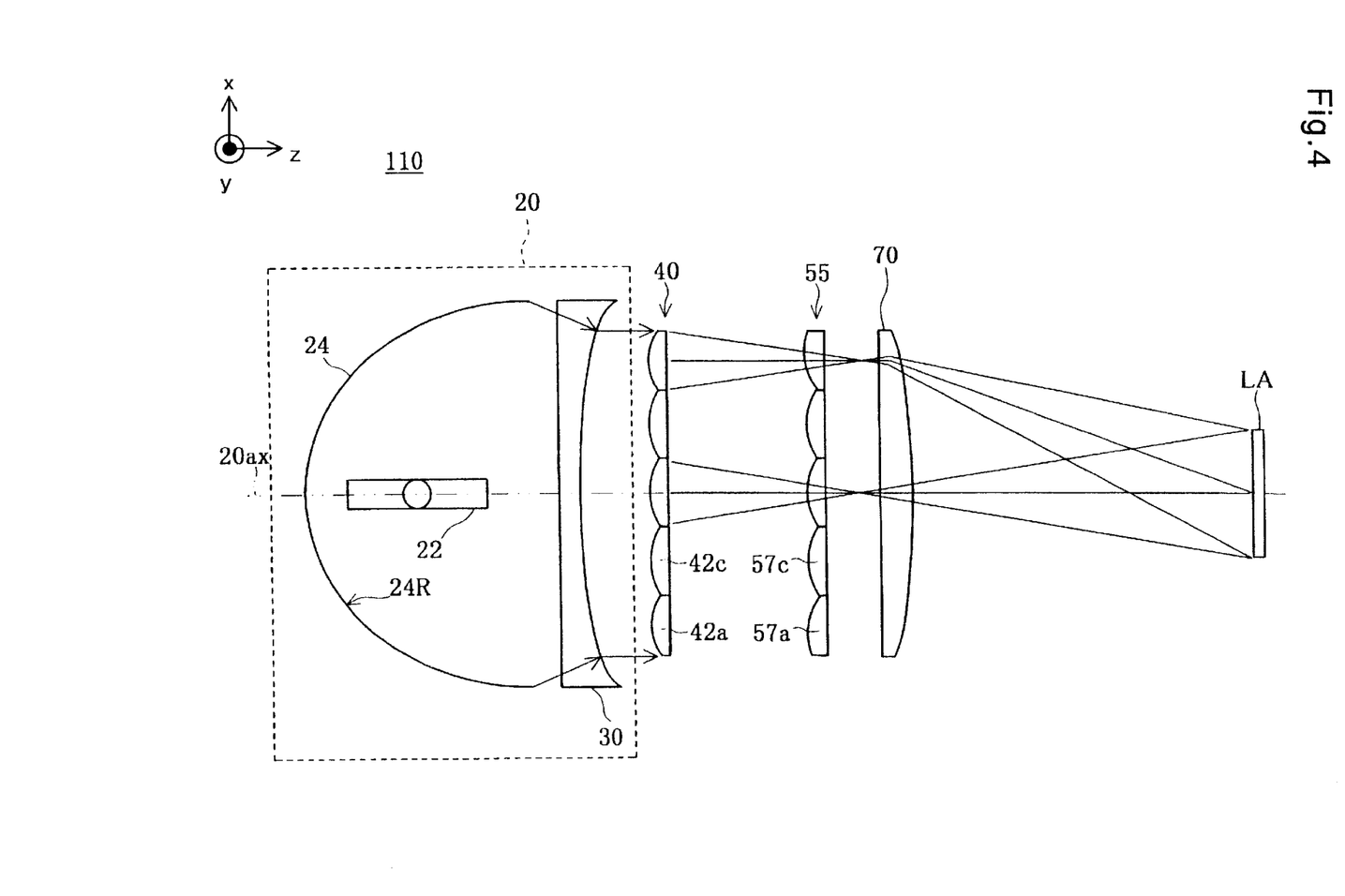
FIG. 4 is an explanatory view showing an illuminating optical system 110 in which the aberration of a superimposing lens 70 is corrected.

FIG. 4 is an explanatory view showing an illuminating optical system 110 in which the aberration of the superimposing lens 70 is corrected. In the illuminating optical system 110 shown in FIG. 4, a second lens array 55 is included in place of the second-lens array 50 in FIG. 1. Other components are the same as those of the illuminating optical system 100 according to the first embodiment. In this embodiment, components similar to those in the illuminating optical system 100 are indicated by the same reference numerals as those in FIGS. 1 and 2, and a detailed description thereof will be omitted.

The second lens array 55 is provided corresponding to a first lens array 40, and the external shape of each of second small lenses 57a and 57c of the second lens array 55 as viewed from the z direction is substantially the same as that of each of the first small lenses 42a and 42c of the first lens array 40 shown in FIG. 1. However, the small lenses 42a and 42c in which optical axes thereof coincide with the geometric central axes thereof are used in the first lens array 40, whereas in the second lens array 55, a decentered lens in which the optical axis thereof does not coincide with geometric central axis thereof is used as a second small lens 57a disposed at a position away from a light source optical axis 20ax (outer periphery), where the aberration of the superimposing lens 70 is relatively large. The small lens 57c is a lens in which the optical axis thereof coincides with the geometric central axis thereof similarly to the small lenses 42a and 42c of the first lens array 40. In this case, as shown in FIG. 4, the central axes of sub light beams emitted from the small lenses 57a and 57c of the second lens array 55 exist on the light source optical axis 20ax when the sub light beams reach a surface to be illuminated via the superimposing lens 70.

Figure 5:
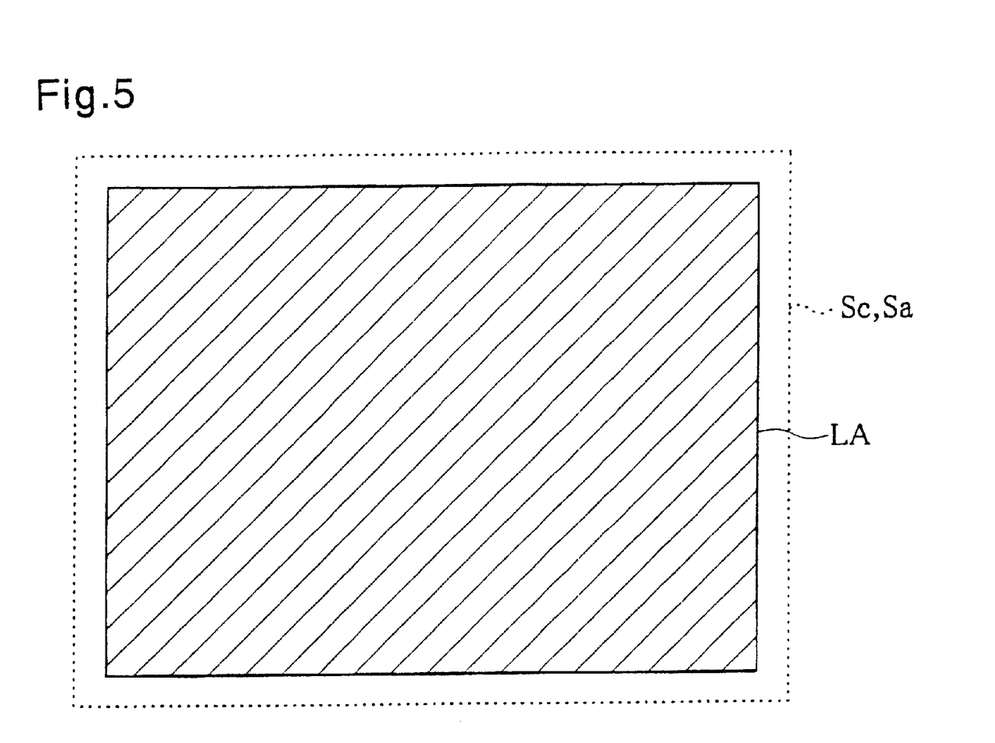
FIG. 5 is an explanatory view showing a light application area formed on a surface to be illuminated by the illuminating optical system 110 in FIG. 4.

FIG. 5 is an explanatory view showing a light application area formed on the surface to be illuminated by the illuminating optical system 110 in FIG. 4. A diagonally shaded area indicates an illumination area LA in FIG. 4. As shown in FIG. 5, a sub light beam emitted from one central small lens 42c of the first lens array 40 forms a light application area Sc including the illumination area LA. In this case, a sub light beam emitted from one outermost peripheral small lens 42a of the first lens array 40 forms a light application area Sa that is the same as the light application area Sc. By using a decentered lens as the small lens 57a of the second lens array that receives light emitted from the small lenses 42a of the first lens array, the sizes of the light application areas Sc and Sa formed by two sub light beams can be set to be equal to each other, and the position of the light application area Sc formed by the sub light beam flux emitted from the central small lens 42c of the first lens array can be brought substantially into coincidence with the position of the light application area Sa formed by the sub light beam emitted from the outermost peripheral small lens 42a. This makes it possible to make the light intensity distribution fairly uniform in the illumination area LA.

In the second lens array 55 in FIG. 4, only the outermost peripheral small lens 57a is a decentered lens, and the central small lens 57c is not a decentered lens. However, other small lenses may, be decentered lenses. When the size of each small lens of the first lens array 40 is set in multiple stages, decentered lenses may be correspondingly used for small lenses other than the outermost peripheral small lens of the second lens array 55, so that the degree of decentering (amount of deviation of the optical axis of the lens from the geometric central axis of the lens) of the decentered lenses may be set in multiple stages. In general, the degree of decentering of a plurality of second small lenses may be set so that the sub light beams emitted from the plurality of first small lenses of the first lens array are applied onto substantially the same position in the surface to be illuminated.

As described above, in the illuminating optical systems 100 and 110 of the first and second embodiments, the size of the outermost peripheral first small lens 42a of the first lens array is set to be smaller than the size of the central first small lens 42c, whereby the sizes of the light application areas formed by sub light beams emitted from the first small lenses are adjusted so as to be substantially equal to each other. Therefore, if the sub light beams are allowed to enter the illumination area LA, light emitted from the light source device can be efficiently utilized.

C. Projector and Illuminating Optical System Thereof

Figure 6:
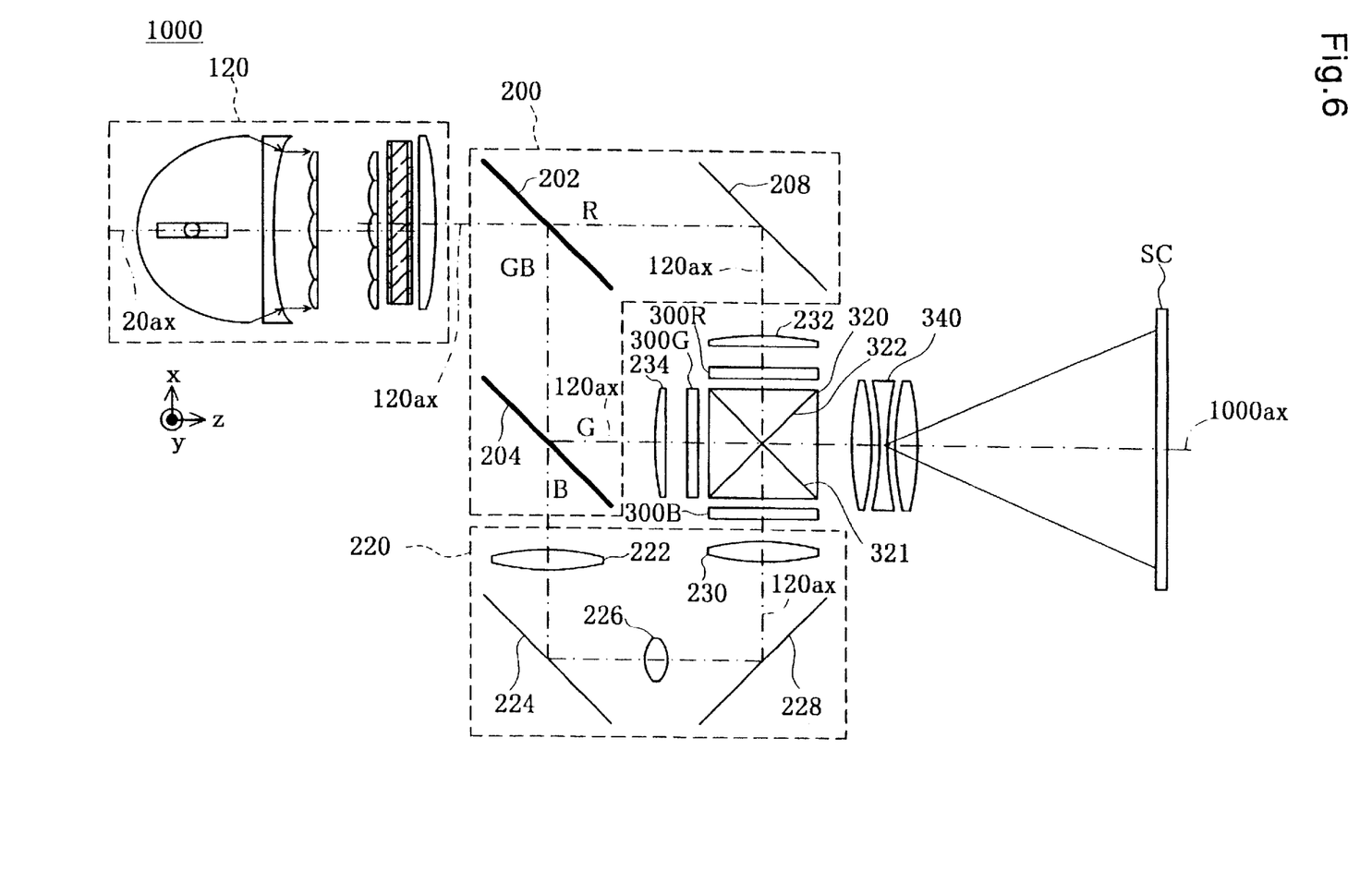
FIG. 6 is a schematic plan view showing the configuration of a principal part of a projector to which the present invention is applied.

FIG. 6 is a schematic plan view showing the configuration of a principal part of a projector to which the present invention is applied. A projector 1000 includes an illuminating optical system 120, an optical color light separation system 200, an optical relay system 220, three liquid crystal light valves 300R, 300G, and 300B, a cross-dichroic prism 320, and a projection optical system 340. Light emitted from the illuminating optical system 120 is separated into colored light of three colors, red (R), green (G), and blue (B), by the optical color light separation system 200. Each separated colored light is modified by the liquid crystal light valves 300R, 300G, and 300B according to image information. Each modulated colored light is synthesized by the cross-dichroic prism 320, and an image is projected and displayed onto a screen SC by the optical projection system 340.

Figure 7:
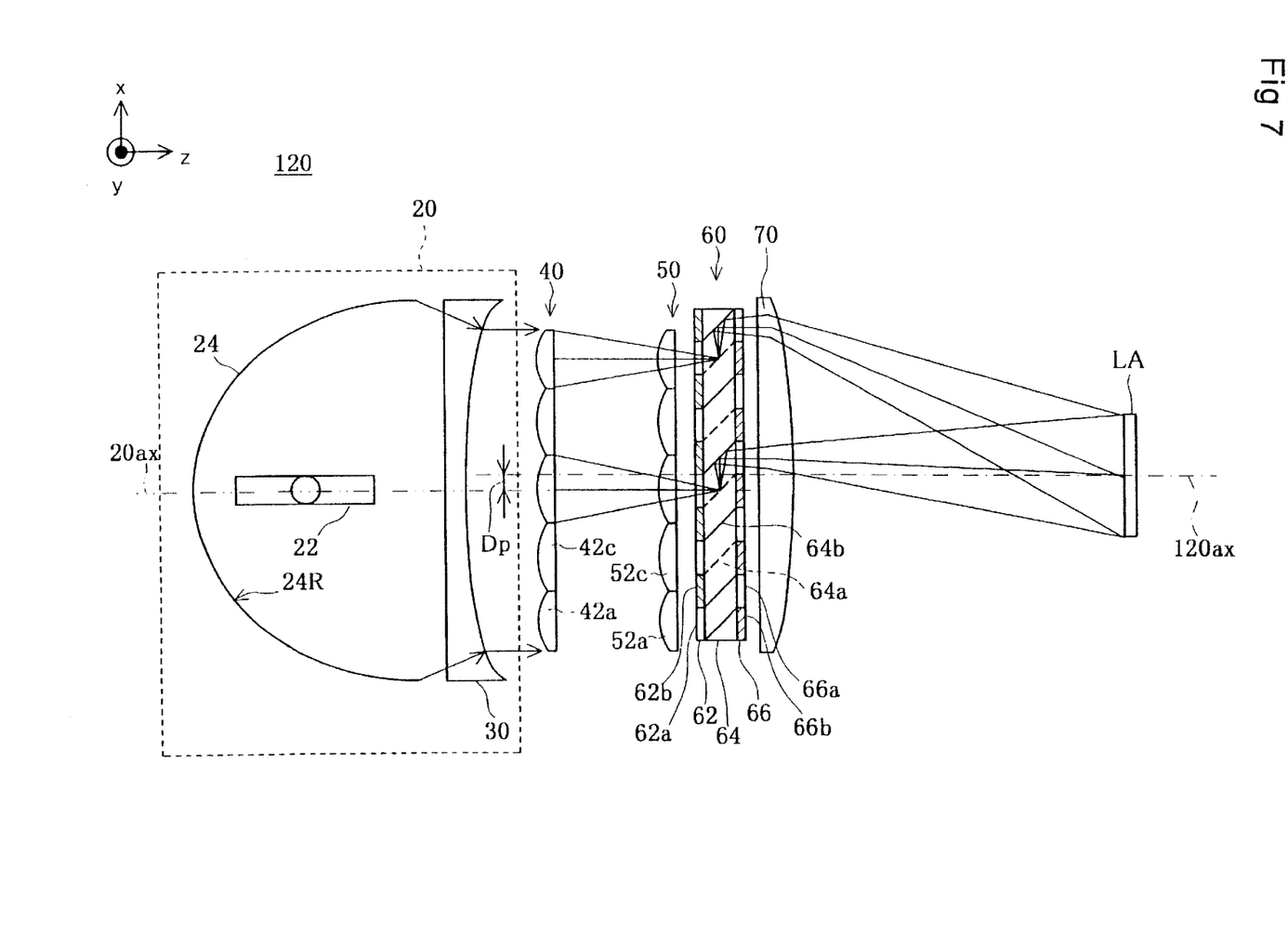
FIG. 7 is an explanatory view schematically showing an illuminating optical system 120 in FIG. 6.

FIG. 7 is an explanatory view schematically showing the illuminating optical system 120 in FIG. 6. This illuminating optical system 120 is formed by adding a polarized-light generating optical system 60 to the illuminating optical system 100 in FIG. 1. Optical elements are disposed along a system optical axis 120ax of the illuminating optical system 120. However, a light source device 20, a first lens array 40, and a second lens array 50 are disposed with reference to a light source optical axis 20ax. The polarized-light generating optical system 60 and the superimposing lens 70 are disposed with reference to the system optical axis 120ax. The light source optical axis 20ax deviates from the system optical axis 120ax substantially in parallel thereto by a predetermined amount of deviation Dp in the x direction in the figure. The amount of deviation Dp will be described later.

A substantially parallel light beam emitted from the light source device 20 is divided by a plurality of first small lenses 42a and 42c of the first lens array 40. A plurality of sub light beams emitted from the first lens array 40 are condensed via a second lens array 50 at a position near the second lens array 50, that is, in the polarized-light generating optical system 60.

Figure 8:
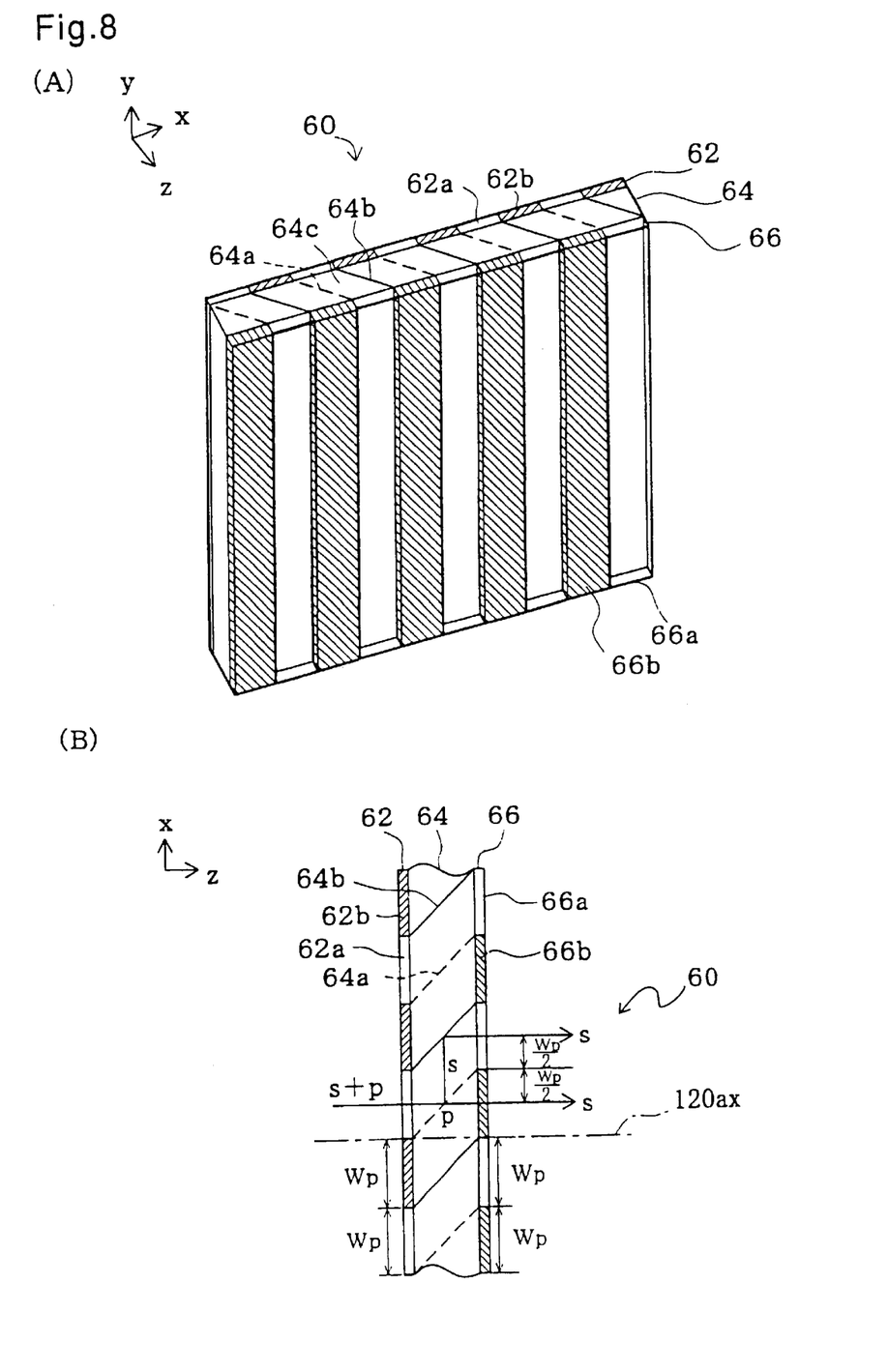
FIGS. 8(A) and 8(B) are explanatory views, each showing a polarized-light generating optical system 60.

FIGS. 8(A)–(B) include explanatory views each showing the polarized-light generating optical system 60. FIG. 8(A) is a perspective view of the polarized-light generating optical system 60. FIG. 8(B) is a part of a plan view of the polarized-light generating optical system 60 shown in FIG. 8(A). The polarized-light generating optical system 60 includes a light-shielding plate 62, a polarized beam splitter array 64, and a selective phase film 66.

The polarized beam splitter array 64 is, as shown in FIG. 8(A), formed by bonding a plurality of columnar light-transmitting plate members 64c, each having substantially the shape of a parallelogram in cross section. Polarized beam separation films 64a and reflecting films 64b are formed alternately on the interfaces of the light-transmitting plate members 64c. A dielectric multilayer film is used as the polarized beam separation film 64a. In addition, a metallic film, such as a dielectric multilayer film or an aluminum film, is used as the reflecting film 64b.

The light-shielding plate 62 is composed of light-shielding surfaces 62b and opening surfaces 62a aligned in stripes. The light-shielding plate 62 has the function of shielding light beams incident on the light-shielding surfaces 62b and passing therethrough a light beam incident on the opening surfaces 62a. The light-shielding surfaces 62b and the opening surfaces 62a are aligned so that the sub light beam emitted from the second lens array 50 (FIG. 7) enters only the polarized beam separation films 64a, and does not enter the reflecting films 64b. More specifically, the light-shielding surfaces 62b and the opening surfaces 62a are disposed so that the center of each opening surface 62a of the light-shielding plate 62 substantially coincides with the center of each polarized beam separation film 64a of the polarized beam splitter array 64. In addition, the width of each opening surface 62a in the x direction is set to be substantially equal to the size Wp of each polarized beam separation film 64a in the x direction. In this case, almost all of the light beams passing through the opening surfaces 62a of the light-shielding plate 62 enter only the polarized beam separation films 64a and do not enter the reflecting films 64b. A flat, plate-like transparent member (such as a glass plate) having a partially light-shielding film (such as a chromium film, an aluminum film, or a dielectric multilayer film) can be used as the light-shielding plate 62. In addition, a light-shielding flat plate, such as an aluminum plate, provided with an opening may be used.

The sub light beams emitted from the second lens array 50 (FIG. 7) enter the opening surfaces 62a of the light-shielding plate 62 with the main light beams (central axes) thereof being substantially parallel to the system optical axis 120ax, as shown by the solid line in FIG. 8(B). The sub light beams passing through the opening surface 62a enter the polarized beam separation film 64a. The polarized beam separation film 64a separates the incident sub light beam into sub light beams of s-polarized light and sub light beams of p-polarized light. In this case, the sub light beams of p-polarized light pass through the polarized beam separation film 64a, and the sub light beams of s-polarized light are reflected by the polarized beam separation film 64a. The sub light beams of s-polarized light reflected by the polarized beam separation film 64a travel toward the reflecting film 64b, where they are further reflected. In this case, the sub light beams of p-polarized light passing through the polarized beam separation film 64a are substantially parallel to the sub light beams of s-polarized light reflected by the reflecting film 64b.

The selective phase film 66 is composed of opening layers 66a and $\lambda/2$ phase layers 66b. In this embodiment, the opening layers 66a are portions where the $\lambda/2$ phase layers 66b are not formed. Each opening layer 66a has the function of transmitting an incident linear polarized light beam unchanged. On the other hand, each $\lambda/2$ phase layer 66b has the function of converting the incident linearly polarized light beam into a linearly polarized light beam whose polarization direction is perpendicular thereto. In this embodiment, the sub light beam of p-polarized light passing through the polarized beam separation film 64a enters the $\lambda/2$ phase layer 66b, as shown in FIG. 8(B). Therefore, the sub light beams of p-polarized light are emitted after having been converted into sub light beams of s-polarized light by the $\lambda/2$ phase layer 66b. On the other hand, the sub light beams of s-polarized light reflected by the reflecting film 64a enter the opening layer 66a, and are emitted unchanged. That is, almost all of the non-polarized sub light beams incident on the polarized-light generating optical system 60 are emitted after having been converted into sub light beams of s-polarized light. By disposing the $\lambda/2$ phase layer 66b only on the emitting surface for the sub light beam of s-polarized light reflected by the reflecting film 64b, almost all of the sub light beams incident on the polarized-light generating optical system 60 can also be emitted after having been converted into sub light beams of p-polarized light.

As will be understood from FIG. 8(B), the centers of two s-polarized light beams emitted from the polarized-light generating optical system 60 deviate from the center of incident non-polarized light (s-polarized light beam and p-polarized light beam) in the x direction. The amount of deviation is equal to half of the width Wp (that is, the size of the polarized beam separation film 64a) of the λ/2 phase layer 66b. For this reason, as shown in FIG. 7, the light source optical axis 20ax and the system optical axis 120ax are set at positions deviating from each other by a distance Dp that is equal to Wp/2.

A plurality of sub light beams emitted from the second lens array 50 are separated into two sub light beams by the polarized-light generating optical system 60 for each of the sub light beams, and are converted into one type of linearly polarized light beams that are polarized in substantially the same direction. The plurality of sub light beams polarized in substantially the same direction are emitted onto the surface to be illuminated after having been superimposed by the superimposing lens 70 in FIG. 7. In the projector 1000 in FIG. 6, the illuminating optical system 120 superimposes and emits the plurality of sub light beams polarized in the same direction onto the liquid crystal light valves 300R, 300G, and 300B.

The polarized-light generating optical system 60 may preferably be provided so as to correspond to the plurality of small lenses 42a and 42c of the first lens array 40 shown in FIG. 7. That is, it is preferable that the thickness of the light-transmitting plate member 64 be changed in accordance with the sizes of the small lenses 42a and 42c of the first lens array 40 so that the center of the polarized beam separation film 64a coincides with the position of the optical axis of the small lens 42a as much as possible. This is because the light utilization efficiency can be further improved by positioning the polarized-light generating optical system 60 to correspond to the plurality of small lenses 42a and 42c of the first lens array 40 in this way. Although the small lens 42c having the first-type size and the small lens 42a having the second-type size shown in the figure have quite different sizes from each other for the convenience of description, as previously described with reference to FIG. 2, they actually differ in size from each other by several percent. Therefore, there is no particular problem in practical application even if the thickness of the light-transmitting plate member 64 is changed as described above.

The optical color light separation system 200 in FIG. 6 includes two dichroic mirrors 202 and 204, and a reflecting mirror 208, and has the function of separating a light beam emitted from the illuminating optical system 120 into colored light of three colors, red, green, and blue. The first dichroic mirror 202 transmits the red light component of the light emitted from the illuminating optical system 120, and reflects the blue light component and the green light component. Red light R passing through the first dichroic mirror 202 is reflected by the reflecting mirror 208 to be emitted toward the cross-dichroic prism 320. The red light R emitted from the optical color light separation system 200 passes through a field lens 232 to reach the liquid crystal light valve 300R for the red light. The field lens 232 has the function of converting the sub light beams emitted from the illuminating optical system 120 into light beams that are parallel to the system optical axis 120ax. This also applies to field lenses 234 and 230 provided in front of other liquid crystal light valves.

Of the blue light B and the green light G reflected by the first dichroic mirror 202, the green light G is reflected by the second dichroic mirror 204, and is emitted from the optical color light separation system 200 toward the cross-dichroic prism 320. The green light G emitted from the optical color light separation system 200 passes through the field lens 234 to reach the liquid crystal light valve 300G for the green light. On the other hand, the blue light B passing through the second dichroic mirror 204 is emitted from the color light separation optical system 200, and enters the optical relay system 220.

The blue light B incident on the optical relay system 220 passes through an incident-side lens 222, a relay lens 226, reflecting mirrors 224 and 228, and an emitting-side lens (field lens) 230 to reach the liquid crystal light valve 300B for the blue light. The optical relay system 220 is used for the blue light B, since the length of the optical path of the blue light B is longer than the length of the optical paths of light of other colors, and the use of the optical relay system 220 allows the blue light B incident on the incident-side lens 222 to be transmitted intact to the emitting-side lens 230.

The three liquid crystal light valves 300R, 300G, and 300B serve as optical modulation units for modulating colored light of three colors according to given image information (image signals) to form images. Each of the liquid crystal light valves 300R, 300G, and 300B is composed of a liquid crystal panel corresponding to the electro-optical device of the present invention, and polarizers disposed on the side of a light incident surface and on the side of a light emitting surface thereof. The polarizers disposed on the side of the light incident surfaces of the liquid crystal panels are intended for increasing the degree of polarization of illumination light, and the polarizers are disposed so that the polarization direction of linearly polarized light beam emitted from the illuminating optical system 120 coincides with the direction of the polarization axes of the polarizers. Each sub light beam incident on each liquid crystal light valve forms a light application area, which will be described later, on the light incident surfaces of the liquid crystal panels. Each light incident surface of each liquid crystal panel corresponds to the surface to be illuminated shown in FIG. 7, including the illumination area LA.

The cross-dichroic prism 320 has the function of a color light-synthesizing optical system for synthesizing the light of the three colors modulated via the liquid crystal light valves 300R, 300G, and 300B, to form a color image. The cross-dichroic prism 320 has red light-reflecting dichroic surfaces 321 and blue light-reflecting dichroic surfaces 322 formed in substantially an X shape on the interfaces of four rectangular prisms. Dielectric multilayer films for reflecting the red light is formed on the red light-reflecting dichroic surfaces 321, and dielectric multilayer films for reflecting the blue light are formed on the blue light-reflecting dichroic surfaces 322. The light of the three colors are synthesized by these red light-reflecting dichroic surfaces 321 and blue light-reflecting dichroic surfaces 322, whereby synthesized light for projecting a color image is formed.

Synthesized light produced by the cross-dichroic prism 320 is emitted toward the optical projection system 340. The optical projection system 340 projects the synthesized light that is emitted from the cross-dichroic prism 320, and displays a color image on the screen SC. A telecentric lens may be used as the optical projection system 340.

Figure 9:
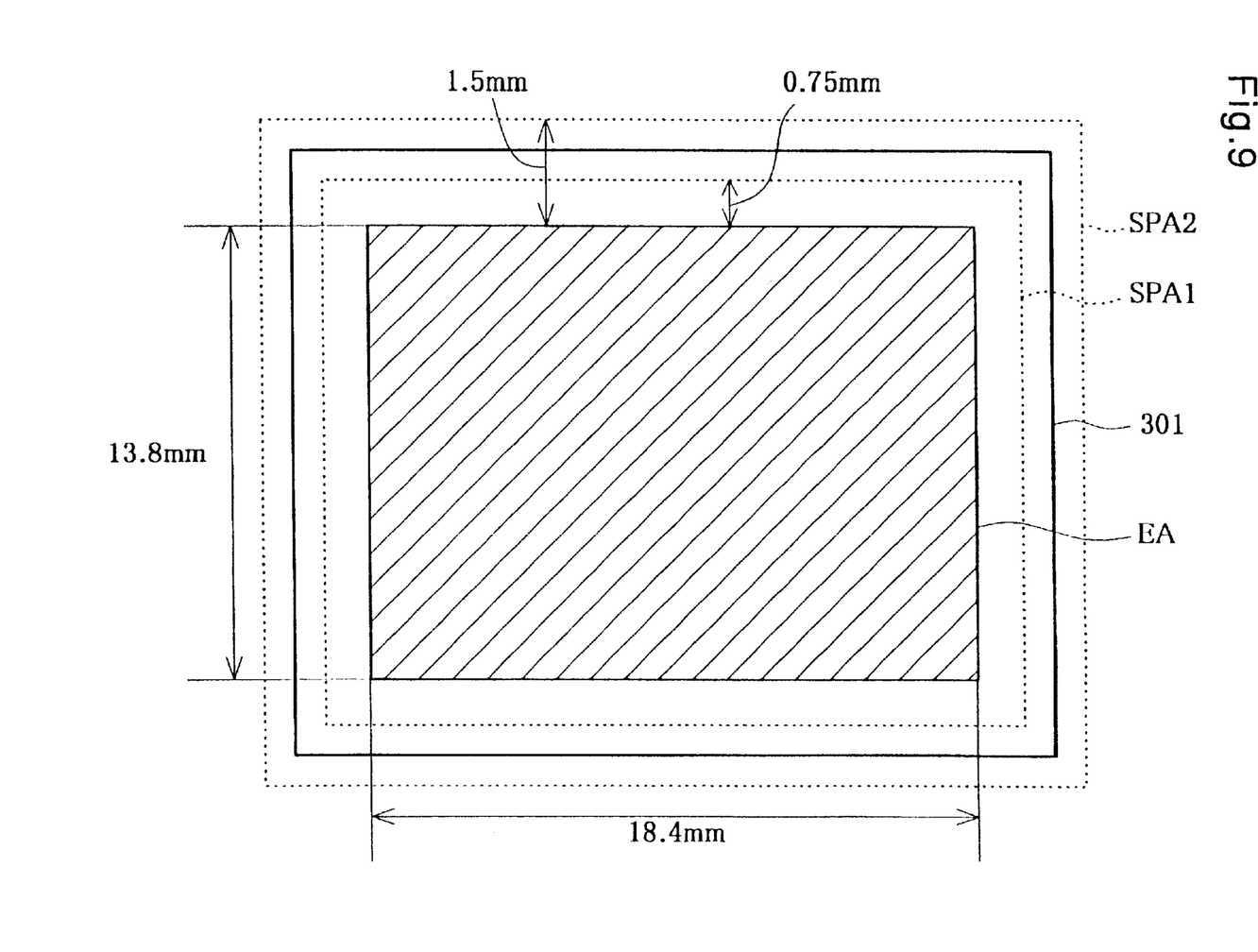
FIG. 9 is an explanatory view showing a light application area in a liquid crystal panel 301 that constitutes liquid crystal light valves 300R, 300G, and 300B.

FIG. 9 is an explanatory view showing a light application area formed on a liquid crystal panel 301 that constitutes the liquid crystal light valves 300R, 300G, and 300B. The liquid crystal panel 301 includes an effective display area EA, on which image light is formed inside thereof. This effective display area EA corresponds to the illumination area LA in FIG. 7. The effective display area EA shows a pixel area to which image information (image signals) representing an image is supplied. Pixels (liquid crystal cells) within the area are driven according to the image information, whereby incident light beams can be modified. When a case is assumed in which the effective display area EA of the liquid crystal panel 301 is of 0.9-inch size, the size of the effective display area EA is about 18.4 mm×about 13.8 mm, as shown in the figure. With respect to the effective display area EA of this size, the size of each of the light application areas formed by a plurality of sub light beams may preferably be about the size of an area SPA1 in FIG. 9. The area SPA1 is an area larger than the effective display area EA by about 0.75 mm in the vertical and horizontal directions.

When the conventional illuminating optical system 900 shown in FIG. 10 is used in the projector 1000, each of the light application areas formed by a plurality of sub light beams emitted from the superimposing lens 70 becomes fairly larger than the liquid crystal panel 301, and the size thereof is about the size of an area SPA2, which is larger than the effective display area EA by about 1.5 mm in the vertical and horizontal directions. When the illuminating optical system 120 to which the present invention is applied is utilized, however, the sizes of light application areas formed by partial light beam fluxes are substantially the same within a predetermined error range because the size of each of the plurality of first small lenses 42a and 42c of the first lens array 40 is adjusted as described above. Therefore, it is possible to set the size of each of the light application areas formed by the plurality of sub light beams to be equal to the size of the area SPA1. The size of each of the plurality of first small lenses 42a and 42c can be adjusted according to the F-number of the superimposing lens 70.

When the F-number ((focal distance f of the superimposing lens)/(diameter of entrance pupil of the superimposing lens)) of the superimposing lens 70 of the illuminating optical system is relatively small, each of the outermost peripheral first small lenses 42a of the first lens array shown in FIG. 7 may preferably be set to be several percent smaller per side of the nearly rectangular external shape with respect to each of the central first small lenses 42c. On the other hand, when the F-number of the superimposing lens 70 is relatively large, the size of each of the outer peripheral first small lenses 42a may be set to be substantially equal to the size of each of the central first small lenses 42c, because the aberration of the superimposing lens 70 decreases. More specifically, when the F-number of the superimposing lens 70 is about 2.0, each of the outermost peripheral small lenses 42a may preferably be about 5% smaller per side of the substantially rectangular external shape with respect to the central small lenses 42c. When the F-number is about 3.0, each of the outermost peripheral small lenses 42a may preferably be about 3% smaller per side of the substantially rectangular external shape with respect to each of the central small lenses 42c. When-the F-number is 4.0 or more, the size of each of the outermost peripheral small lenses 42a may be set to be substantially equal to the size of each of the central small lenses 42c. In general, when the F-number of the superimposing lens is relatively small, and is within the range of about 2 to about 5 that is a practical range, it is preferable that each of the small lenses disposed on the outer periphery of the first lens array be about 1% to 10% smaller per side with respect to each of the central small lenses. If such a first lens, array is used, the size of each of the light application areas formed by sub light beams emitted from the first lens array can be set so as to be substantially the same size within a predetermined error range. In addition, in this case, since the sub light beams can be allowed efficiently to enter the effective display area EA, light emitted from the illuminating optical system 120 can be efficiently utilized, and the brightness of the image to be projected and displayed can be improved.

While the illuminating optical system 120 in which the polarized-light generating optical system 60 is added to the illuminating optical system 100 shown in FIG. 1 is used in the projector 1000 of this embodiment, an illuminating optical system in which the polarized-light generating optical system 60 is added to the illuminating optical system 110 shown in FIG. 4 may be used instead. In this case, the central axes of the plurality of sub light beams emitted from the plurality of first small lenses can be brought substantially into coincidence with each other in the center of the effective display area EA of the liquid crystal panel 301. Therefore, illumination light having a further uniform intensity distribution can be applied onto the effective display area EA. In addition, even if the illuminating optical systems 100 and 110 are used without being combined with the polarized-light generating optical system 60, similar advantages can be obtained.

The three field lenses 232, 234, and 230 in the projector 1000 of this embodiment convert the sub light beams emitted from the illuminating optical system 120 into light that are parallel to the system optical axis 120ax and allow the light to enter the effective display area EA of the liquid crystal panel. Therefore, in the projector 1000, the illuminating optical system 120 (FIG. 7) in which the field lenses 232, 234, and 230 are included can be called an illuminating optical system. However, the illuminating optical system of the present invention may include at least a light source device, a first lens array and the superimposing lens, in order for light emitted from the light source device to reach the surface to be illuminated.

As described above, in the illuminating optical system of the above embodiments, the size of each of the small lenses disposed on the outer periphery of the first lens array is smaller than the size of each of the small lenses disposed on the center of the first lens array. For this reason, it is possible to set the size of each of the light application areas formed by the first small lenses disposed on the center of the first lens array and the first small lenses disposed on the outer periphery away from the center to be substantially the same size within a predetermined error range, whereby light emitted from the light source device can be allowed efficiently to enter the illumination area. Therefore, in the illuminating optical system 120 and the projector 1000, it is possible to improve the utilization efficiency of light emitted from the light source device.

The present invention is not limited to the above-described embodiments and modes for carrying out the invention, and can be carried out in various forms without departing from the sprit and scope of the invention. For example, the following modifications can be made.

(1) While an example has been described in the above embodiments in a case where the illuminating optical system of the present invention is applied to a transmissive projector, it is possible to apply the present invention to a reflective projector. Here, "transmissive" means that an electrooptical device serving as an optical modulation unit, such as a transmissive liquid crystal panel, is of a type for transmitting light, and "reflective" means that an electrooptical device serving as an optical modulation unit, such as a reflective liquid crystal panel, is of a type for reflecting light. In the reflective projector, a cross-dichroic prism may be utilized as a color light separation means for separating light into colored light of three colors, red, green, and blue, and may also be used as a color light-synthesizing unit for synthesizing the modulated colored light of three colors and emitting the synthesized light in the same direction. When this present invention is applied to the reflective projector, advantages that are substantially similar to those of the transmissive projector can be obtained.

(2) While the projector 100 for displaying a color image has been described in the above embodiments, the illuminating optical system of the present invention can be applied to a projector for displaying a monochrome image. In this case, advantages similar to those of the above projector can be obtained.

(3) While the liquid crystal panel is used as the electrooptical device in the projector 1000 in the above embodiments, the electrooptical device is not limited thereto. In general, any device may be used as the electrooptical device as long as it modifies incident light according to image information, and a micro-mirror-type optical modulation device or the like may be utilized.

What is claimed is:

1. An illuminating optical system comprising:

a light source device that emits a substantially parallel light beam;

a first lens array having a plurality of first small lenses that divides said light beam into a plurality of sub light beams; and a superimposing lens that superimposes and emits said plurality of sub light beams emitted from the first lens array onto a surface to be illuminated, a size of each of said first small lenses disposed on an outer periphery of said first lens array being set to be smaller than a size of each of said first small lenses disposed on a center of said first lens array so that light application areas formed on a surface to be illuminated by said plurality of sub light beams emitted from said plurality of first small lenses have substantially a same size within a predetermined error range.

2. The illuminating optical system as claimed in claim 1, each of said plurality of first small lenses having a similar shape as viewed from a direction of a central axis of said light beam.

3. The illuminating optical system as claimed in claim 1, said first lens array being composed of two types of small lenses consisting of relatively large first-type small lenses disposed on the center and relatively small second-type small lenses disposed on the outer periphery.

4. The illuminating optical system as claimed in claim 1, each of said plurality of first small lenses having a substantially rectangular shape as viewed from a direction of a central axis, and the size of each of said first small lenses disposed on the outer periphery of the first lens array being about 1% to 10% smaller per side with respect to the size of each of the first small lenses disposed on said center of the first lens array.

5. The illuminating optical system as claimed in claim 1, further comprising a second lens array having a plurality of second small lenses corresponding to said plurality of first small lenses of said first lens array, of said plurality of second small lenses, a small lens that receives light emitted from the first small lenses disposed on said outer periphery of said first lens array being a decentered lens.

6. A projector comprising:

an illuminating optical system having a light source device that emits a substantially parallel light beam, a first lens array having a plurality of first small lenses that divides said light beam into a plurality of sub light beams, and a superimposing lens that superimposes and emits the plurality of sub light beams emitted from the first lens array onto a surface to be illuminated;

an electrooptical device having a light incident surface serving as a surface to be illuminated that is illuminated by said illuminating optical system and that modulates the light beam incident from said illuminating optical system according to image information; and a projection optical system that projects said modulated light beam obtained by said electrooptical device, a size of each of said first small lenses disposed on an outer periphery of said first lens array being set to be smaller than a size of each of said first small lenses disposed on a center of said first lens array so that light application areas formed on a surface to be illuminated by said plurality of sub light beams emitted from said plurality of first small lenses have substantially a same size within a predetermined error range.

7. The projector as claimed in claim 6, each of said plurality of first small lenses having a similar shape as viewed from a direction of a central axis of said light beam.

8. The projector as claimed in claim 6, said first lens array being composed of two types of small lenses consisting of relatively large first-type small lenses disposed on the center and relatively small second-type small lenses disposed on the outer periphery.

9. The projector as claimed in claim 6, each of said plurality of first small lenses having a substantially rectangular shape as viewed from a direction of a central axis, and the size of each of the first small lenses disposed on the outermost periphery of said first lens array being about 1% to 10% smaller per side with respect to the size of each of the first small lenses disposed on said center of the first lens array.

10. The projector as claimed in claim 6, further comprising a second lens array having a plurality of second small lenses corresponding to said plurality of first small lenses of said first lens array, of said plurality of second small lenses, a small lens that receives light emitted from the first small lenses disposed on said outer periphery of said first lens array being a decentered lens.

* * * * *